United States Patent [19]

Stone, Jr.

[11] Patent Number: 4,867,349
[45] Date of Patent: Sep. 19, 1989

[54] SUBSTANTIALLY SEALED COFFEE POT HAVING A GRAVITY FLOW LIQUID TRAP

[75] Inventor: Wayne B. Stone, Jr., Bethesda, Md.

[73] Assignee: Wood Manufacturing Co., Inc., Flippin, Ark.

[21] Appl. No.: 896,712

[22] Filed: Aug. 15, 1986

Related U.S. Application Data

[63] Continuation-in-part of Ser. No. 532,980, Sep. 16, 1983, abandoned.

[51] Int. Cl.[4] ............................................. B67D 3/00
[52] U.S. Cl. .................................. 222/188; 222/465.1; 222/478; 222/564
[58] Field of Search ............... 222/456, 481, 566, 188, 222/478, 564; 99/275; 220/205, 361; 215/234, 259

[56] References Cited

U.S. PATENT DOCUMENTS

| | | | |
|---|---|---|---|
| 41,447 | 2/1864 | Rawson . | |
| 98,177 | 12/1869 | Mattheus, Jr. | 222/188 |
| 163,502 | 5/1875 | McFarland | 222/188 |
| 251,151 | 12/1881 | Winfield . | |
| 640,495 | 1/1900 | Spangler | 222/188 |
| 642,787 | 2/1900 | Eakin . | |
| 644,831 | 3/1900 | Shade | 222/188 |
| 831,419 | 9/1906 | Day . | |
| 959,012 | 5/1910 | Hintermann | 222/188 |
| 1,436,708 | 11/1922 | Goebel . | |
| 1,534,670 | 4/1925 | Smith . | |
| 1,601,723 | 10/1926 | Elbert | 222/456 X |
| 2,190,092 | 2/1940 | Bailey | 221/98 |
| 2,425,142 | 8/1947 | Brubaker | 222/455 |
| 2,993,629 | 7/1961 | Ruhnke | 222/542 |
| 3,114,484 | 12/1963 | Serio | 222/566 X |
| 3,171,571 | 3/1965 | Daniels | 222/94 |
| 4,116,357 | 9/1978 | Stanley | 220/205 |
| 4,171,075 | 10/1979 | Gangwisch | 222/456 |
| 4,331,257 | 11/1982 | Stone, Jr. | 222/464 |
| 4,638,929 | 1/1987 | Stone, Jr. | 222/456 |

FOREIGN PATENT DOCUMENTS

| | | | |
|---|---|---|---|
| 38784 | 8/1907 | Fed. Rep. of Germany | 222/564 |
| 478147 | 2/1953 | Italy | 222/456 |

Primary Examiner—Joseph J. Rolla
Assistant Examiner—Mona C. Beegle
Attorney, Agent, or Firm—Banner, Birch, McKie & Beckett

[57] ABSTRACT

A top assembly for substantially sealing the open mouth of a coffee pot to thereby prevent oxidation and evaporation of the coffee. The top assembly includes a single passageway for both introducing coffee into the pot and for pouring coffee from the pot. The passageway includes a plurality of substantially parallel sub passages. The sub passages form a liquid trap which prevents air from entering the passageway as well as preventing evaporation from the pot. The sub passages are interconnected to form a channel which is substantially U-shaped in cross-section. The inlet to the liquid trap from inside the coffee pot is at the base of the U-shaped channel so that when the coffee pot is tilted to pour coffee from the pot, there is a gravity flow through the liquid trap and the liquid head pressure insures that all coffee in the pot may be poured out.

1 Claim, 4 Drawing Sheets

SUBSTANTIALLY SEALED COFFEE POT HAVING A GRAVITY FLOW LIQUID TRAP

CROSS-REFERENCE TO RELATED PATENT APPLICATIONS

This is a continuation-in-part of application Ser. No. 532,980, filed Sept. 16, 1983, now abandoned. A similar concept is disclosed in application Ser. No. 598,767, filed Apr. 10, 1984, now U.S. Pat. No. 4,638,929.

BACKGROUND OF THE INVENTION

The concept of extending the "pot life" of decanter contained coffee by introducing a freshly brewed coffee into a substantially sealed decanter by way of a liquid trap and subsequently decanting coffee from the decanter through the same liquid trap whereby oxidation and evaporation of the decanter contained coffee is substantially eliminated was introduced by applicant's copending application Ser. No. 532,980, filed Sept. 16, 1983. The final form of the commercial version of that concept, which has been successfully marketed throughout the United States, is shown in applicant's copending application Ser. No. 598,767, filed Apr. 10, 1984. The entire disclosures of the aforesaid copending applications are herein incorporated by reference. Coffee pots embodying the concept disclosed in the last-mentioned copending application are marketed under the assignee's registered trademark "Everfresh" and the top assembly which is substantially sealed with respect to the open mouth of a coffee pot, which includes the liquid trap, is known as the "Everfresh" insert.

Public acceptance of the Everfresh concept for its function of keeping coffee fresh for hours has been universal; however, the solution of coffee deterioration as detailed in the aforesaid copending patent applications introduces other problems, the solution of which is the subject of the present application.

The problems, in descending order of importance as determined by both food service and housewares surveys, are:
1. Inability to decant the last cup of coffee from the pot without removing the top assembly;
2. Insufficient pour rate;
3. Diminishing pour rate as the coffee level is lowered requiring excessive inversion of the pot; and
4. Occasional leakage of coffee across the top assembly during pouring;
   (a) Across the spline joint of the commercial version (U.S. patent application Ser. No. 598,767, now U.S. Pat. No. 4,638,929); and
   (b) Across deformed seals.

SUMMARY OF THE INVENTION

Solution of the first three of the aforementioned problems was achieved through the use of a liquid trap permitting gravity flow-through while decanting, as opposed to siphon flow, and positioning the same on the downstream side of the decanting flow path.

With reference to the commercial version (Ser. No. 598,767, now U.S. Pat. No. 4,638,929) it will be seen that the liquid trap is defined by continuous wall means which extend well below the bottom wall of the top assembly. Thus once the coffee level in the decanter is down to about two cups there is just enough liquid remaining to submerge the trap and start the siphon flow that will allow the next cup to be poured. After the pot has again been placed upright on a warming burner, and the siphon broken, insufficient coffee remains to initiate a siphon to decant the last cup of coffee. Even when the decanter is fully inverted, the trap cannot be submerged because the remaining coffee simply lies against the undersurface of the top assembly and cannot submerge the inlet end of the trap.

When the liquid trap is placed on the downstream side of the decanting flow path all of the coffee will decant by gravity. The pour rate of such a construction is greatly improved by forming the trap with substantially parallel sub flow passages to eliminate, as far as possible, a convoluted flow path and maintaining as close to a linear flow path as is consistent with the retention of the liquid trap when the pot is placed upright after decanting. When the decanting inlet to the liquid trap is substantially coplanar with the bottom wall of the top assembly and a gravity flow-through trap is employed, as opposed to a siphon trap, all of the coffee within the pot may be decanted. The pour rate for the last few cups of coffee is increased by forming an upwardly extending well in the bottom wall of the top assembly and positioning the decanting inlet to the liquid trap in the base of the well. This increases the liquid head pressure and directs the last liquid vestiges to the trap.

All joints between the interfitting parts have been eliminated in those areas that would allow any coffee leaking therethrough to flow along any path other than the designed, decanting flow path. In one version, seal deformation and consequent leakage have been eliminated by the elimination of the deformable seal.

DESCRIPTION OF THE PREFERRED EMBODIMENTS

Figure 1:
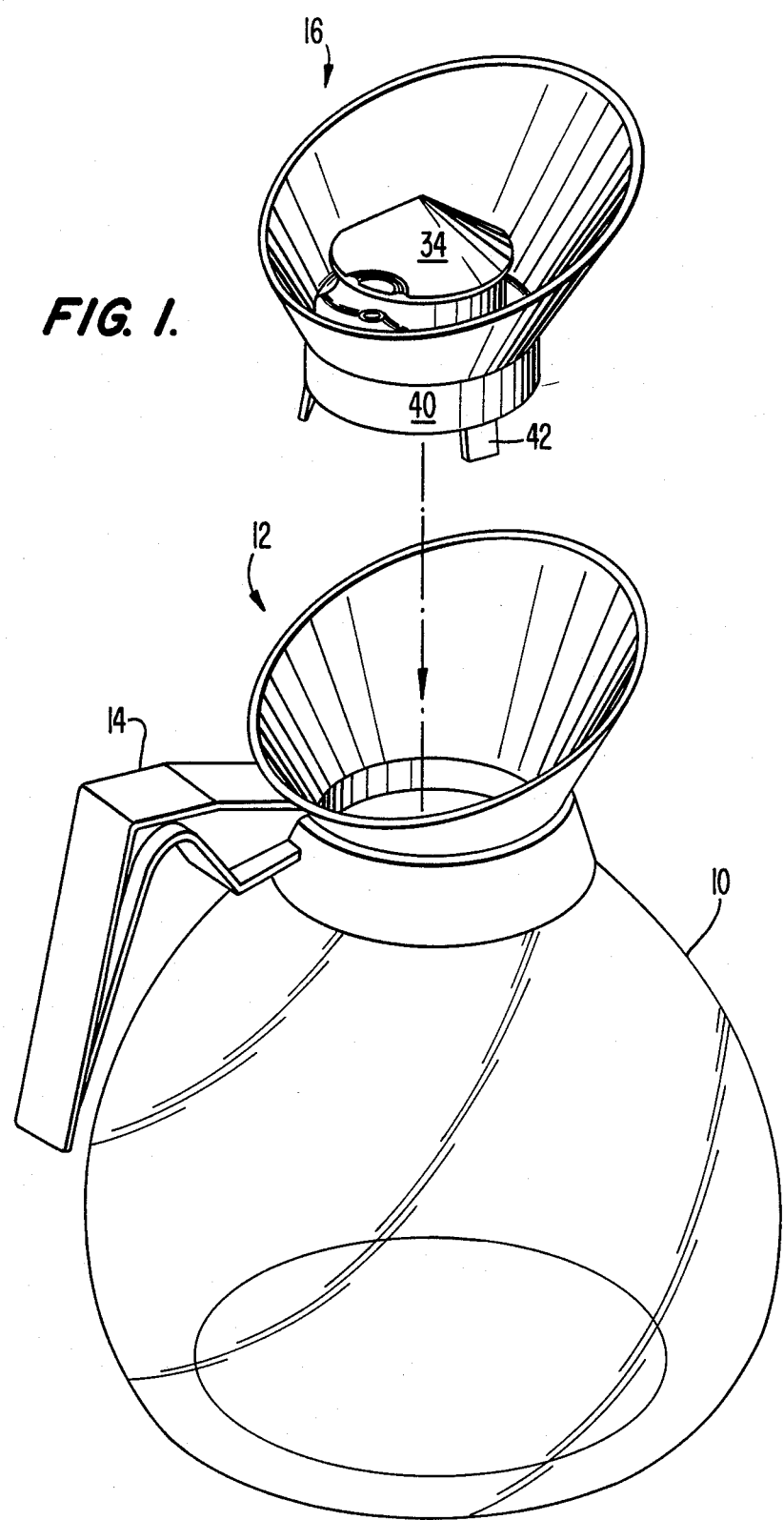
FIG. 1 is an exploded isometric view of a conventional food service bowl and a top assembly incorporating the features of the present invention.
Figure 2:
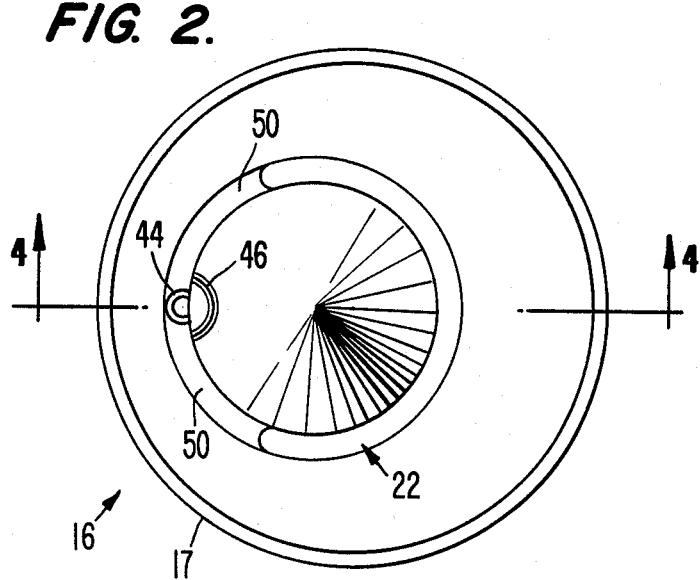
FIG. 2 is a top plan view of the top assembly shown in FIG. 1.
Figure 3:
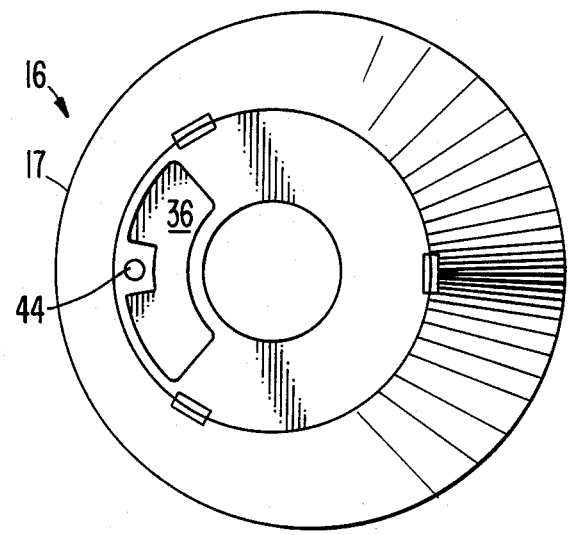
FIG. 3 is a bottom plan view thereof.
Figure 4:
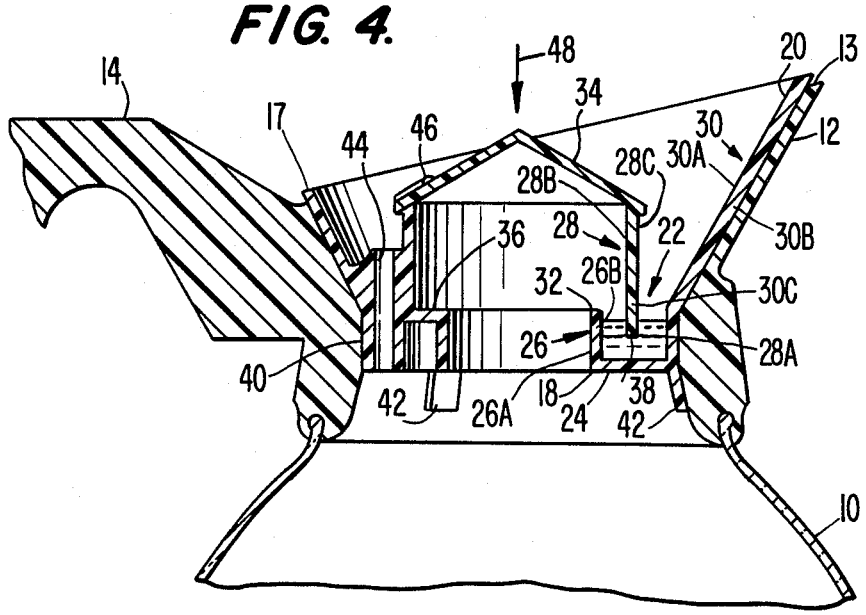
FIG. 4 is a vertical section illustrating the seating of the top assembly within the bowl, portions of the bowl being broken away.
Figure 5:
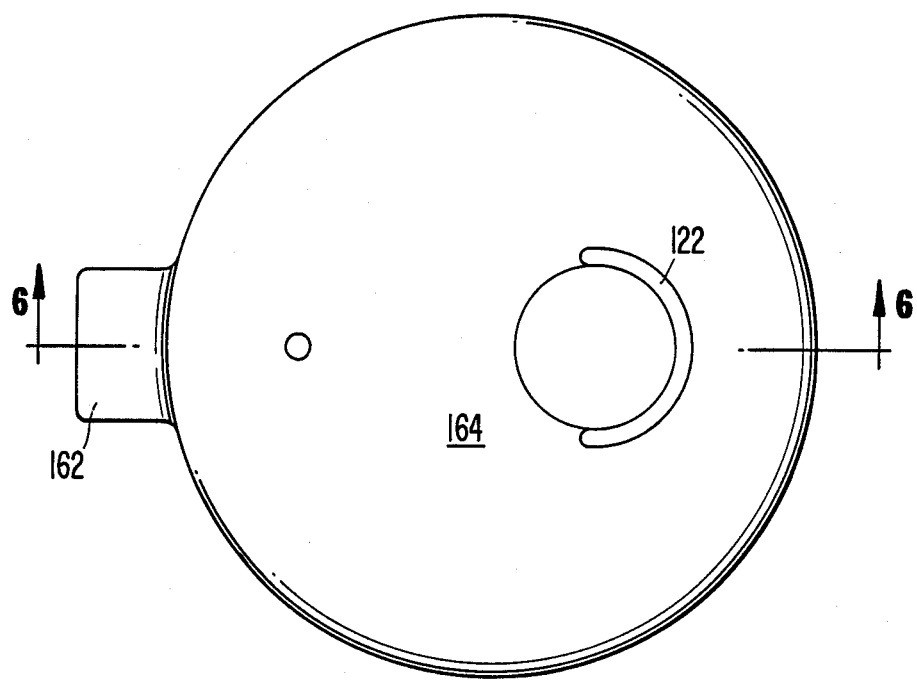
FIG. 5 is a top plan view of a second embodiment of the invention illustrating a top assembly adapted to interfit with the relatively large open mouth of a typical housewares bowl.

A typical food service bowl 10, of the type manufactured by Bloomfield Industries, 4546 47th Street, Chicago, Ill. 60632 is illustrated in FIGS. 1 and 4 and includes an integrally bonded, generally conical plastic lip 12 and integral handle 14.

Top assembly 16 is preferably an integrally molded assembly having an outer housing 17 sized and shaped to close and seal the open mouth 13 of bowl 10. The open mouth 13 is defined and circumscribed by lip 12. Top assembly 16 includes flow passage means extending therethrough, the flow passage means extending from decanting inlet 18 to decanting outlet lip 20 and including a liquid trap 22. Liquid trap 22 is composed of three sub flow passages 26, 28 and 30. The liquid trap is situated above bottom wall 24 of top assembly 16 so that, when the top assembly is seated in plastic lip portion 12 of bowl 10, as shown in FIG. 4, decanting flow from bowl 10 is by gravity flow via sub flow passages 26, 28 and 30 and ultimately across pour lip 20.

First sub flow passage 26 is defined by the inside surface 26A of a circumferential wall 26B extending upwardly from bottom wall 24. Flow passage 26 extends upwardly from decanting inlet 18 and terminates in an open upper end 32 through which decanting coffee flow is by way of gravity to second sub flow passage 28.

Second flow passage 28 is defined in part by the outside surface 28A of wall 26B and the inside surface 28B of circumferential wall 28C. Wall 28C is integrally formed with and extends downwardly from a conical cap 34, which closes the upper end of second sub flow passage 28. The lower end of sub flow passage 28 is closed by an extension 36 integrally formed with and projecting radially inwardly from the inner surface of housing 17 and terminating at the upper open end of wall 26B. Top assembly 16 is specifically positioned and oriented within bowl 10 so that a non-pouring side is adjacent handle 14 and a pouring side is adjacent lip 12. Extension 36 extends throughout an arc of less than 180 degrees on the handle, or non-pouring, side of the top assembly. The lower end of wall 28C terminates in an end 38 lying intermediate the open upper end 32 of first sub flow passage means 26 and bottom wall 24 throughout an arc of more than 180 degrees.

Third sub flow passage 30 is defined by the inner surface 30A of circumferential wall 30B and the outer surface 30C of wall 28C. The lower end of third sub flow passage 30 is closed by bottom wall 24. Thus, as shown clearly in the drawings of first, second and third sub flow passage means 26, 28 and 30 interconnect to form the liquid trap 22 which, because of wall 28c and extension 36, extends throughout an arc of more than 180 degrees on the pour side of the top assembly.

Figure 6:
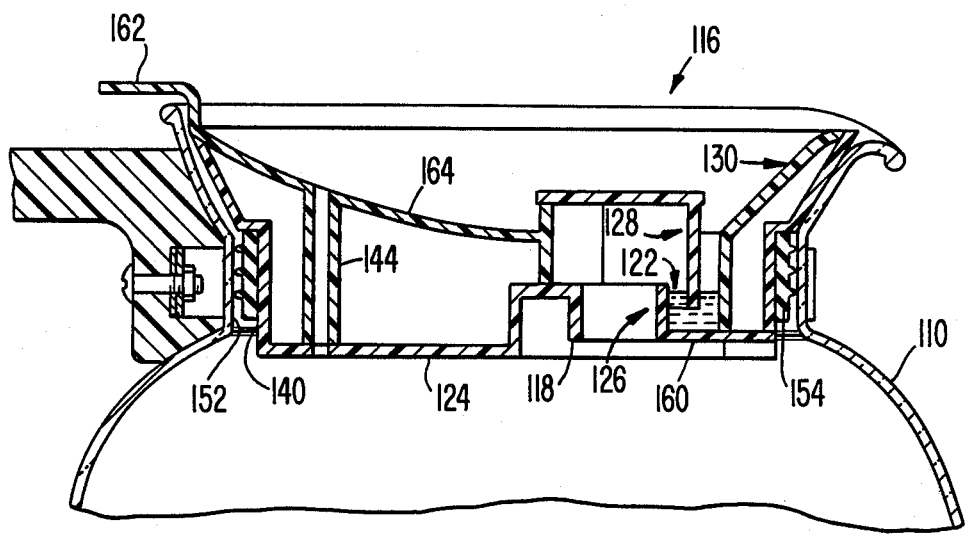
FIG. 6 is a sectional view of the top assembly of FIG. 5 taken along line 6—6 thereof and illustrating the same in sealing engagement with a fragmentarily illustrated housewares bowl.
Figure 7:
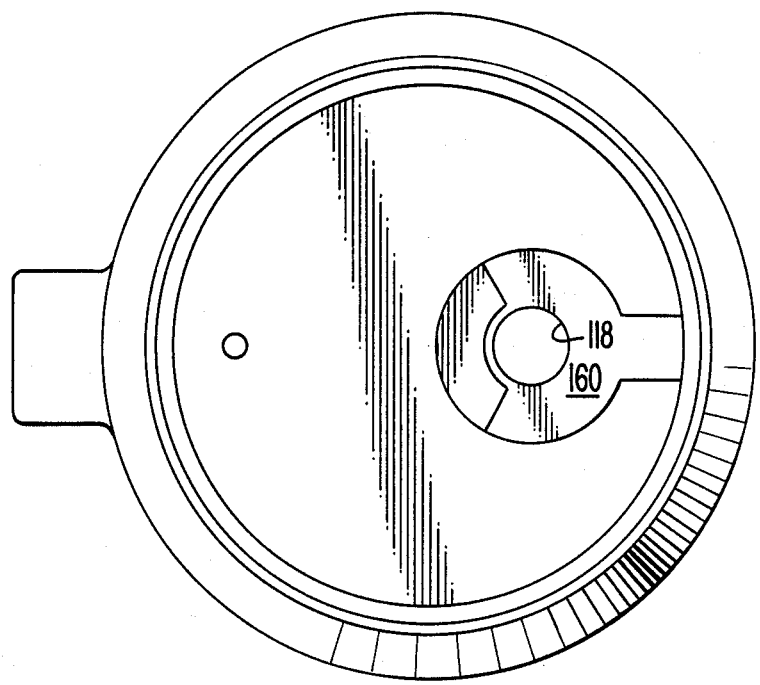
FIG. 7 is a bottom plan view of FIG. 5.
Figure 8:
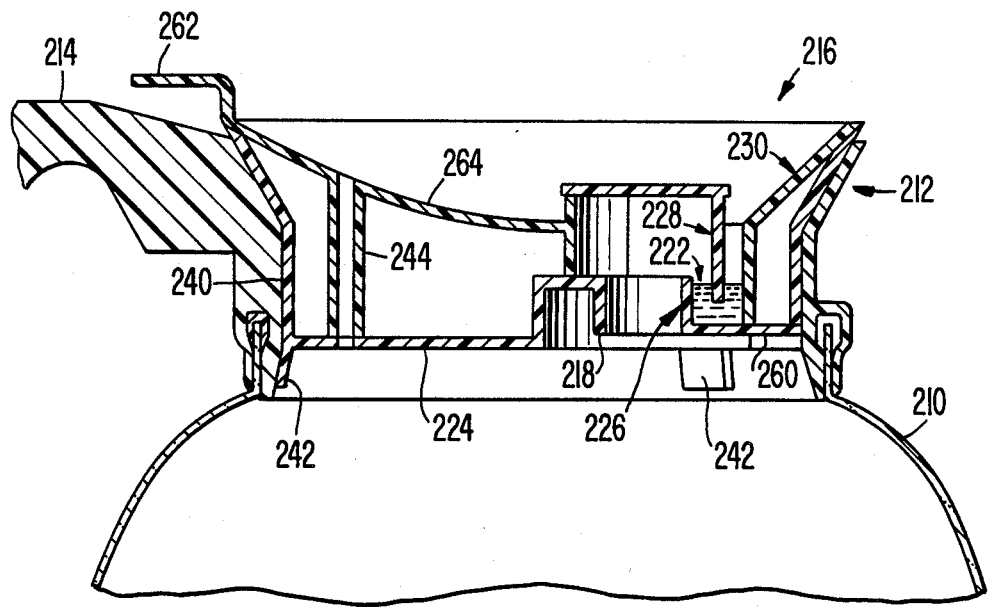
FIG. 8 is a vertical section through a third embodiment of the invention illustrating the seating of the same in a modified, plastic lipped, housewares bowl.

As shown clearly in FIGS. 4, 6, and 8, the first, second, and third sub flow passages forming liquid trap 22 are interconnected to form a channel which is substantially U-shaped in cross-section. This U-shaped channel constitutes an upwardly recessed well which retains coffee, as shown.

The outer profile of lip 20, and particularly the cylindrical portion 40 thereof, is sized to sealingly interfit with plastic lip 12. Depending, deformable legs 42 snap fit with the interior profile of lip 12. The overall height of decanting outlet lip 20 just exceeds that of lip 12 so that removal of top assembly 16 is by grasping opposite sides of the upwardly extending edges of decanting outlet lip 20 with the thumb and forefinger.

Top assembly 16 is vented, at 44, by a vent hole whose diameter is of such size that recirculating flow cannot be established therethrough when trap 22 is blocked with coffee. Typically, vent 44 is $\frac{1}{8} \pm 1/16''$. The upper conical surface 34 is formed with a raised ledge, or "fence", 46 just above vent 44 to direct inflowing coffee 48, from a coffee maker, to either side of vent 44 onto downwardly slanting walls 50 on either side of vent 44 and thence to trap 22. That portion of coffee inflow 48 falling on the pour side of the surface 34, of course, falls directly into trap 22.

In operation, top assembly 16 is inserted into plastic lip 12 of an empty bowl 10 prior to its placement under an automatic drip coffee maker. Initial coffee inflow from the coffee maker, indicated at 48, establishes the liquid trap with additional inflowing coffee causing the trap to overflow the open upper end 32 of first sub flow passage means 26 and fall into pot 10. Thus from the first instance of brewing, the interior of pot 10 is sealed with respect to incoming air because, while filling, the residual air in the pot is forced out vent 44 precluding air entry and, while subsequently being maintained heated on a warming burner, the vapor pressure of the coffee at approximately 190 degrees Fahrenheit exceeds that of atmosphere so that no air can enter the vent.

Evaporation does not occur because the pot is totally sealed except for the small vent 44 whose diameter is too small to permit a recirculating gas flow (outflowing steam and inflowing replacement air) to be established. Stated differently, as soon as steam attempts to exit vent 44, with no incoming replacement air flow being permitted by the liquid trap, a static condition exists across the vent, otherwise a vacuum would exist within the pot which is not possible.

The top assemblies 116, 216 shown in FIGS. 5-7 and 8, respectively, are similar in construction and concept to that just described but adapted to interfit with the relatively large open mouth typical of housewares bowls as opposed to food service bowls of the type already described.

Top assemblies 116 and 216 differ only in the manner in which they interfit with housewares bowls 110, 210. Thus the embodiment of FIGS. 5-7 includes a cylindrical portion 140 spaced from the cylindrical glass wall portion 152 of pot 110 and the seal therebetween is effected by a silicon rubber gasket 154. Whereas, in FIG. 8, bowl 210 is formed with an integral plastic lip 212 and handle 214 and cylindrical portion 240 of top assembly 216 sealingly interfits with lip 212. Flexible legs 242 insure the integrity of the assembly.

Bottom walls 124, 224 are recessed at 160, 260 (to provide a well when the top is inverted to a decanting position) in which decanting inlets 118, 218 originate to assure that, when inverted to decant, all the coffee will be decanted. Sub flow passage means 126, 126; 128, 228 and 130, 230 cooperate to form liquid traps 122, 222 as described in connection with FIGS. 1-4.

Top assemblies 116, 216 include handles 162, 262 formed integrally with sloping top walls 164, 264 which direct inflowing coffee from a coffee maker to traps 122, 222. Tubular vents 144, 244, of course, extend through both top and bottom walls 164, 264 and 124, 224.

The operation of the embodiments shown in FIGS. 5-8 is essentially the same as that previously described.

For further information as to the manner in which the plastic lips 12 and 212 may be integrated with the glass bowls 10, 210 reference may be had to U.S. Pat. No. 4,090,648.

I claim:

1. In combination with an imperforate walled coffee pot having an open mouth;

an integrally molded top assembly substantially sealed with respect to said open mouth through which coffee is introduced from the exterior of said pot to the interior thereof and subsequently dispensed from the interior of said pot externally thereof;

said top assembly having a bottom wall and a liquid flow passage extending therethrough, and circumferential sidewalls, said liquid flow passage extending from an inlet in said bottom wall to an outlet lip extending outwardly and upwardly from said bottom wall and adapted to sealingly engage the open mouth of the coffee pot;

said bottom wall and said side walls forming an upwardly recessed wall;

said liquid flow passage including a liquid trap located above said bottom wall for continuously sealing said liquid flow passage by retaining a volume of coffee therein following the initial introduction of coffee therethrough into said coffee pot and retaining a volume of coffee therein until the last of the coffee has been dispensed therethrough from said coffee pot;

said liquid flow passage including first, second and third interconnected sub flow passages comprising, with said bottom wall, said liquid trap;

a cap covering said first and second sub flow passages, said cap having an outer surface with means for directing in-flowing coffee to said recessed well;

said first sub flow passage defined by a first circumferential wall extending upwardly from said recessed well in said bottom wall, said first sub flow passage having a base adapted to be positioned adjacent the open mouth of the coffee pot, said base of said first sub flow passage defining an inlet to said liquid trap, said first sub flow passage terminating in an upper open end spaced above said bottom wall;

said second sub flow passage defined between said first circumferential wall and a second circumferential wall extending downwardly from said cap so that said cap closes the upper end of said second subflow passage, said second circumferential wall surrounding at least a part of said first sub flow passage and substantially parallel thereto, the upper end of said second sub flow passage terminating in an upper closed end spaced above the open upper end of said first sub flow passage and the lower end of said second sub flow passage terminating intermediate said bottom wall and the open upper end of said first sub flow passage, the lower end of said second sub flow passage being closed by an integrally formed extension member joined to said first circumferential wall of said first sub flow passage throughout an arc of less than 180°;

said third sub blow passage defined between said second circumferential wall and a third wall forming a decanting outlet, said third sub flow passage substantially parallel to and surrounding at least a part of said first and second sub flow passages and terminating in an upper, open, decanting end spaced above the open upper end of said first sub flow passage;

at least a portion of the lower end of said third sub flow passage formed by said bottom wall to thereby form, with said first and second sub flow passages and said bottom wall, said liquid trap, said liquid trap precluding air entry through said sub flow passages to the interior of said pot as well as evaporation from the interior of said pot to atmosphere; and a restricted vent opening across said top assembly.

* * * * *